BEST AVAILABLE COPY
BEST AVAILABLE COPY
UNITED STATES PATENT OFFICE.
FREDERICK E. NEARING, OF BROOKFIELD, CONNECTICUT, ASSIGNOR TO CHARLES LA DOW, OF ALBANY, NEW YORK.
HORSE-RAKE AND HAY-SPREADER.
Re 9541
1-25-1881
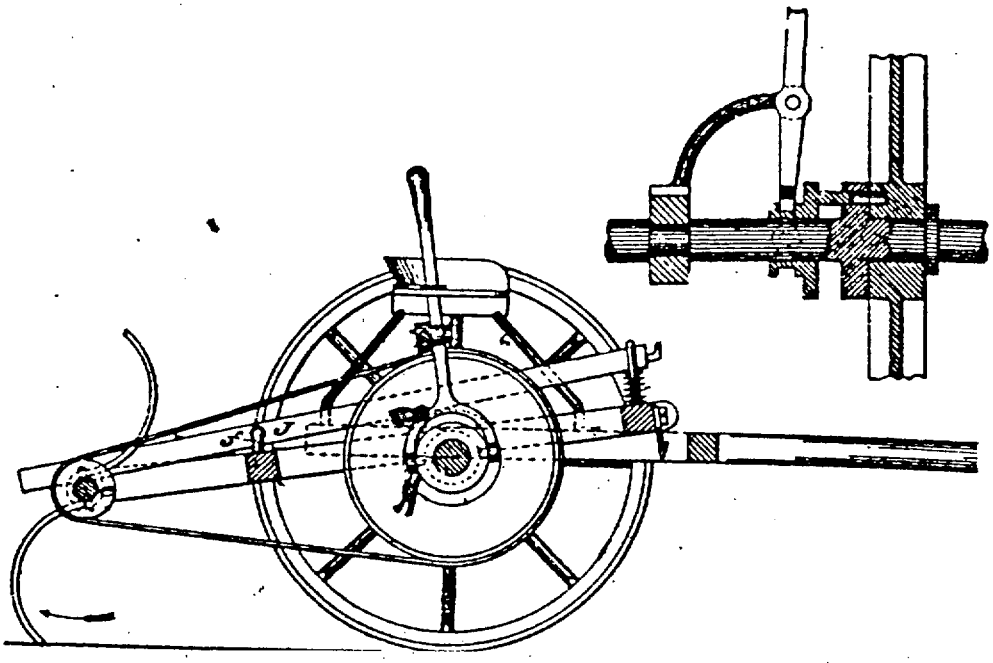

BEST AVAILABLE COPY

BEST AVAILABLE COPY

UNITED STATES PATENT OFFICE.

FREDERICK E. NEARING, OF BROOKFIELD, CONNECTICUT, ASSIGNOR TO CHARLES LA DOW, OF ALBANY, NEW YORK.

HORSE-RAKE AND HAY-SPREADER.

SPECIFICATION forming part of Reissued Letters Patent No. 9,541, dated January 25, 1881.

Original No. 73,192, dated January 7, 1868. Application for reissue filed December 6, 1880.

DIVISION B.

*To all whom it may concern:*

Be it known that I, FREDERICK E. NEARING, of Brookfield, in the county of Fairfield and State of Connecticut, have invented a new and Improved Combined Horse-Rake and Tedder; and I do hereby declare that the following is a full, clear, and exact description thereof, which will enable those skilled in the art to make and use the same, reference being had to the accompanying drawings, forming a part of this specification.

Figure 1 is a side sectional view of my invention, taken in the line *x x*, Fig. 2; Fig. 2, a plan or top view of the same; Fig. 3, a section of a portion of the same, taken in the line *y y*, Fig. 2.

Similar letters of reference indicate corresponding parts.

This invention relates to a new and improved combination of a horse-rake and tedder; and it consists of a peculiar construction and arrangement of parts, as hereinafter fully shown and described, whereby the device may, by a very simple manipulation, be readily converted from a rake into a tedder, and vice versa, and rendered capable of operating in either capacity equally as well as if made specially for either purpose.

It further consists of an organization of parts whereby the traction-power of both traveling-wheels can be used to oscillate the rake-head by means of a friction device connecting the head, at the will of the operator, with a revolving part of the rake in such manner that when the proper connection is made the motion of either wheel, when advancing, may assist in lifting the head and teeth, and when backed may not operate to prevent their being raised by the power of the advancing wheel, the friction connection between the operating parts serving to relieve them from severe shocks or relative displacement when being coupled together, and also preventing liability of breaking the devices should the operator fail to disengage them at the proper time.

It further consists in combining, with a friction lifting device, a stop for the operating-lever to strike against and thus limit the oscillation of the rake-head, the power of the wheels being conveyed to the rake-head by means of a friction connection which relieves the operating parts from the sudden shock and strain incident to stopping the motion of a rake-head connected to the lifting-wheels by cog-gearing only.

In the accompanying sheet of drawings, A A represent thills the rear parts of which are secured to an axle, B, having a wheel, C, on each end of it, the axle being allowed to turn freely in boxes or bearings at the under sides of the thills. The wheels C C are fitted loosely on the axle B, but are connected to it, when the device is drawn forward, by means of pawls *a* on the wheels engaging with ratchets *b* on the axle, the pawls slipping over the ratchets when the device is backed.

The driver's seat D is supported by rods C from the thills A A, and on the axle B there is fitted loosely a pulley, E, which may be connected therewith, when desired, by a clutch, F.

G is a rectangular frame, which is fitted loosely on the axle B, so as to work freely thereon. This frame projects considerably to the rear of the axle B, and has an ordinary revolving rake fitted to its rear end. This rake may be provided with wire teeth *d*, curved in the usual way, and said rake, when used to tedder or scatter hay, is rotated continually from the axle B by means of a belt, I, the latter passing around a pulley, *e*, on the rake-head and around the pulley E on the axle, the pulley being connected with the axle by means of the clutch F. When the rake H is thus rotated it turns in the direction indicated by arrow 1, the convex sides of the teeth acting upon the hay, so that the latter will not be carried around with the rake, but be thrown upward and outward behind it.

When the device is used as a horse-rake the pulley E is disconnected from the axle B, the clutch F being thrown out from the pulley, and the rake H, consequently, will not be rotated under the draft movement of the machine. The rake is, in this adaptation of the device, prevented from rotating casually by means of a lever-bar, J, balanced on the frame G and resting on a fulcrum, *f*, the rear part of said bar having a notch made in it for spurs

*g g* on the rake-head to alternately catch against. Under the front end of the lever-bar J there is a spiral spring, K, which has a tendency to keep the rear end down upon the rake-head.

When the device is used as a tedder, the rear end of the lever-bar is kept above and free from the rake-head by having the front end of the former depressed or forced down and kept in that position by a hook, *h;* and when the device is to be used for raking, the hook *h* is disengaged from the front end of the lever-bar, and the spring K forces up said end and forces down the rear end upon the rake-head.

When the lower teeth of the rake have gathered up a load, the driver with his foot presses down the front end of the lever-bar J, thereby raising the rear end of the latter and freeing the rake-head, so that the rake may make a half-revolution and discharge its load, the upper teeth, *d*, when turned down to working position, being stopped and retained by the spur *g*, which was previously at the under side of the rake-head, catching against the notch of the lever-bar J.

By allowing the foot-lever J to remain in its normal position when the machine is to be used as a rake, and throwing the clutch F into gear with the wheel E, said wheel is locked to the revolving lifting-wheel, and the frame G, with its head H and teeth *d*, will oscillate partially around the axle B, to discharge the gathered load. When the clutch F is removed from the wheel E, the teeth fall by virtue of their own gravity, and resume a raking position. The clutch F is shifted by a lever, L, which extends up at one side of the driver's seat D. The lever L works in a guide or slot which controls its range of movement.

It will be seen that in this adaptation of the devices the head H is made to oscillate on the same center as that on which the wheels revolve; hence the head and the revolving portion of the rake will always remain at a uniform distance apart, and all the operative parts, when coupled together during the process of dumping the hay, will preserve the same relative position, and not be displaced by the rotation of the wheels or the oscillation of the head.

It will also be seen that the connection from the rake-head to the lifting-wheel at the will of the operator to dump the hay is effected by a directly-connecting belt having a support upon the rake-head, and therefore moving therewith at all times, and connecting to the lifting-wheel, when engagement is made as hereinbefore described.

It will also be seen that the connection between the wheels and the rake-head is of such a nature that both wheels, when advancing, may assist to raise the teeth, and also that either advancing wheel will raise them, and cannot be prevented therefrom by the action of the other wheel when backed or remaining stationary.

It will also be seen that the head and teeth cannot be unduly raised, nor the lifting mechanism overstrained, as the lever L, in the operation of dumping, moves forward until it strikes against a stop fastened to the seat D, when, if the clutch is not thrown out from engagement with the pulley E, the revolving portion of the rake will continue its rotation and the friction-belt will slip around the pulley E, and the head and teeth remain in a raised position without doing any harm to the devices. When the clutch is disengaged from the pulley the teeth fall by virtue of their own gravity, and resume a raking position.

It will also be seen that an oscillating head has advantages over one that is revolved in bearings to discharge the hay, inasmuch as one is moved from the gathered hay when discharging the same, while the other must revolve in close proximity to the windrow, and is therefore liable to become entangled therewith.

It will also be seen that as the seat for the driver is mounted on the thill-frame between the wheels, and the rake-frame is oscillated by the power of both wheels, or by either of them, from the center on which said wheels revolve, that the stop prevents such oscillation of the frame as would interfere with the driver, and also makes said oscillation uniform when operated by the motion of either wheel separately or by both wheels together.

It will also be seen that the lifting power of both wheels is communicated to the rake-head, at the will of the operator, by means of a friction device operating in such manner that the wheels and head may be coupled together for oscillating the head from a common center with the wheels, without the noise, strain, and wear incident to machines which connect the head to the wheels by cog-gearing only.

I am aware that heretofore rakes have been made with a revolving head capable of being coupled to one of the carrying-wheels by friction devices, as shown in the patents of N. E. Allen, dated April 20, 1858, and J. C. Stoddard, dated September 11, 1860.

I am also aware that rakes have been made with a head revolving in bearings in rear of the carrying-wheels, and capable of having frictional contact with both of said wheels by means of an interposed crank-rod, pulley, and belts, as shown in the patent of J. Crites, dated April 2, 1861.

I am also aware that rakes have been made with a head oscillating in line with the center of the carrying-wheels, and capable of frictional contact with one of said wheels, as shown in the patent of D. W. Amos, dated January 12, 1864.

I am also aware that rakes have been made with a head oscillating in line with the center of the carrying-wheels, and capable of having frictional contact with both of said wheels, as shown in the patents of Daley and Treat, dated November 11, 1862, and Bailey and Burdick, dated June 26, 1866.

I am also aware that rakes have been made with a head oscillating in line with the center of the carriage-wheels, and connected, at the will of the operator, by means of pawls and ratchets, for coupling the head directly to both of said wheels, as shown in the patent of Smith and Cowles, dated September 10, 1861, and also in other patents of similar cog dumping construction.

This division of my invention is for a rake in which the traction power of both wheels may, at the will of the operator, be applied, through the medium of a friction connection, to a rake head and teeth to oscillate the same from a common center with the carrying-wheels, in such manner that when both wheels are advancing they may act in concert to assist in raising the head to discharge the hay, and when either one of said wheels is advancing and the other non-rotating, or rotating backward, that the advancing wheel may raise the teeth, in contradistinction to the constructions shown in the Crites, the Daley and Treat, and the Bailey and Burdick patents, in which the respective friction devices, when applied, are of equal power on both wheels, whether advancing or when backed. Consequently, when turning curves the lifting power of either advancing wheel in each of the above-named devices is neutralized by an equal amount of friction on the wheel that is rotated backward, causing torsion of the head, and failing to raise the teeth by the power of the wheels.

I claim as my invention—

1. In a horse hay-rake, the combination of a draft-frame, carrying-wheels, a rake-head oscillating from a center common with the wheels, a friction device for transmitting the power of both wheels to the rake-head, at the will of the operator, and capable of raising the head when the wheels are rotated in opposite directions, and a lever for causing the engagement of the parts, substantially as described.

2. In a horse hay-rake, the combination of a draft-frame, an oscillating rake-head, driving-wheels, a friction device capable of raising the teeth, at the will of the operator, by the power of either wheel when they are rotated in opposite directions, and a lever for transmitting the power of both wheels to the friction device, substantially as described.

3. In a horse hay-rake, the combination of a draft-frame, driving-wheels, a rake-head oscillating from a point in line with the center of the wheels, friction mechanism for coupling the wheels and head together, a lever for causing the engagement of the parts, and a stop against which the lever abuts to limit the oscillation of the rake, substantially as described.

4. The combination, substantially as described, of a rake-head, a draft-frame, a revolving axle, driving-wheels thereon, a friction-pulley on said axle, and mechanism for locking the head to the axle.

5. The combination of a draft-frame, driving and carrying wheels, a rake-frame, a friction-strap interposed between a revolving portion of the rake and the rake-head, and mechanism for causing the friction-strap to oscillate the frame and the rake-teeth.

6. The combination of a draft-frame, a rake-frame oscillating freely in line with the center of the wheels as its center of motion, and mechanism for operating a friction-belt for elevating the frame and the teeth at the will of the driver.

FREDERICK E. NEARING.

Witnesses:
WM. W. DIAMOND,
W. H. COLBERT.